(12) United States Patent
Peck et al.

(10) Patent No.: US 7,246,776 B2
(45) Date of Patent: *Jul. 24, 2007

(54) METHOD AND SYSTEM FOR CMG ARRAY SINGULARITY AVOIDANCE

(75) Inventors: Mason A. Peck, Scottsdale, AZ (US);
Brian J. Hamilton, Glendale, AZ (US);
Brian Underhill, Glendale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 320 days.

This patent is subject to a terminal disclaimer.

(21) Appl. No.: 10/897,494

(22) Filed: Jul. 23, 2004

(65) Prior Publication Data

US 2006/0027708 A1 Feb. 9, 2006

(51) Int. Cl.
*B64G 1/24* (2006.01)
(52) U.S. Cl. .................. 244/171; 701/13; 244/165
(58) Field of Classification Search .................. 701/13; 244/158.8, 164, 165, 171
See application file for complete search history.

(56) References Cited

U.S. PATENT DOCUMENTS

| | | | | |
|---|---|---|---|---|
| 5,269,483 A | * | 12/1993 | Flament | 244/164 |
| 5,875,676 A | * | 3/1999 | Bailey et al. | 74/5.22 |
| 6,039,290 A | | 3/2000 | Wie et al. | |
| 6,047,927 A | * | 4/2000 | Heiberg et al. | 244/165 |
| 6,128,556 A | * | 10/2000 | Bailey | 701/13 |
| 6,131,056 A | | 10/2000 | Bailey et al. | |
| 6,154,691 A | * | 11/2000 | Bailey | 701/13 |
| 6,354,163 B1 | | 3/2002 | Heiberg | |
| 6,648,274 B1 | * | 11/2003 | Bailey et al. | 244/165 |
| 6,681,649 B2 | * | 1/2004 | Hyde et al. | 74/5.47 |
| 6,917,862 B2 | * | 7/2005 | Wie | 701/13 |

FOREIGN PATENT DOCUMENTS

| WO | WO 03/001311 | 1/2003 |
|---|---|---|
| WO | WO 2004/032392 | 4/2004 |
| WO | PCT/US2005/025614 | 7/2006 |

* cited by examiner

*Primary Examiner*—Timothy D. Collins
(74) *Attorney, Agent, or Firm*—Ingrassia Fisher & Lorenz

(57) ABSTRACT

The present method provides a method for avoiding singularities in the movement of CMGs in an array of CMGs in a spacecraft. In a first step, a torque command representing a desired torque to produce an attitude adjustment for the spacecraft is received. Next, a range-space gimbal rate required to produce the desired torque based on the desired torque and a Jacobian matrix is calculated. Then, a null-space gimbal rate that assists in the avoidance of singularities is calculated. The total gimbal rate command is determined by summing the range-space gimbal rate and the null-space gimbal rate. Then, the total gimbal rate command is provided to the CMGs to produce the total gimbal rate.

4 Claims, 3 Drawing Sheets

METHOD AND SYSTEM FOR CMG ARRAY SINGULARITY AVOIDANCE

TECHNICAL FIELD

This invention relates to the field of spacecraft vehicle control and, more specifically, to a method and system for CMG array singularity avoidance.

BACKGROUND

In order to control the attitude of a spacecraft, various rotating inertia members are used. One such inertia member is a control moment gyroscope (CMG). A CMG typically comprises a flywheel with a fixed or variable spin rate mounted to a gimbal assembly. The spin axis of the CMG can be tilted by moving the CMG using the gimbal assembly. This motion produces a gyroscopic torque orthogonal to the spin axis and gimbal axis.

To achieve full attitude control of a spacecraft, a minimum of three CMGs, arranged such that each CMG in the CMG array imparts torque about a linearly independent axis, is typically used. The CMGs are moved about their. gimbal axis in response to a command for torque from the spacecraft attitude-control system. Expressed mathematically, a Jacobian A maps the CMG gimbal rates into a three dimensional array torque:

$$A\omega = \tau$$

where A is a 3×n Jacobian matrix, ω is a n×1 array of gimbal rates for the n gimbals, and τ is a 3×1 array of torque components to be imparted to the spacecraft. From the above equation and with a known torque command, τ, the individual gimbal rates for each CMG can be calculated. Using the known Moore-Penrose pseudoinverse to invert the Jacobian matrix, a set of possible gimbal rates is:

$$\omega = A^T(AA^T)^{-1}\tau$$

Inherent in the use of CMGs is the possibility that the CMGs' momentum vectors may line up in such a way that one or more components of the requested torque cannot be provided. Mathematically this situation occurs when the eigenvalues of $AA^T$ approach zero, causing $(AA^T)^{-1}$ to go to infinity. Or, equivalently, singularities occur when the determinant of the matrix $AA^T$ is equal to zero (expressed algebraically as det $(AA^T)=0$). In the case of a 3×n matrix A, this is equivalent to saying the rank of the matrix $AA^T$ is two or less.

Different approaches have been devised to avoid singularities in the movement of CMGs. In one approach, to ensure that $(AA^T)^{-1}$ never is 0, $(AA^T)^{-1}$ is replaced by $(AA^T+\epsilon I)^{-1}$ where I is the identity matrix and $\epsilon$ is a small number. The use of a positive $\epsilon$ ensures that $\det(AA^T+\epsilon I)^{-1}$ never becomes 0.

While useful in some instances, a drawback to this approach is that this approach changes the gimbal rate calculation. An analogous problem is the scalar expression $$\frac{1}{a^2+\varepsilon}.$$

As a→0, $$\frac{1}{a^2+\varepsilon} \to \frac{1}{\varepsilon},$$

which is well-behaved but not equal to $$\frac{1}{a^2}.$$

In the case of the Jacobian A, the pseudoinverse no longer exactly maps gimbal rates into the commanded torques because of the error $\epsilon$ introduces. This resulting error steers the spacecraft in the wrong direction and can introduce significant, undesired torque, especially near the singularity.

A further drawback of the $(AA^T+\epsilon I)^{-1}$ approach is that it does very little until the CMGs are already very near the singularity, where gimbal-rate capability (and therefore CMG array torque capability) can be undesirably low. Instead, what is needed is a method and system for singularity avoidance that keeps the CMG array well conditioned by steering toward optimal gimbal angles rather than allowing CMG array performance to degrade until, at the last instant, the CMG array dodges the singularity with undesired torques.

SUMMARY OF THE INVENTION

In one embodiment of the present invention, a method for avoiding singularities in the movement of CMGs in an array of CMGs in a spacecraft is provided. In a first step, a torque command representing a desired torque to produce an attitude adjustment for the spacecraft is received. Next, a range-space gimbal rate required to produce the desired torque based on a Jacobian matrix is calculated. Then, a null-space gimbal rate that assists in the avoidance of singularities is calculated. The total gimbal rate command is determined by summing the range-space gimbal rate and the null-space gimbal rate. Then, the total gimbal rate command is provided to the CMGs to produce the total gimbal rate.

In another embodiment, a momentum control system for producing commands to move CMGs within a CMG array is disclosed. The momentum control system includes an attitude control system configured to receive data representative of a desired maneuver. In response to the data representative of a desired maneuver, the attitude control system determines a torque command to complete the desired maneuver. A momentum actuator control processor coupled the attitude control system receives the torque command. The momentum actuator control processor, in response to receiving the torque command, calculates a gimbal rate command comprising a range-space gimbal rate and a null-space gimbal rate.

BRIEF DESCRIPTION OF THE DRAWINGS

The present invention will hereinafter be described in conjunction with the following drawing figures, wherein like numerals denote like elements, and.

DETAILED DESCRIPTION OF A PREFERRED EMBODIMENT

Figure 1:
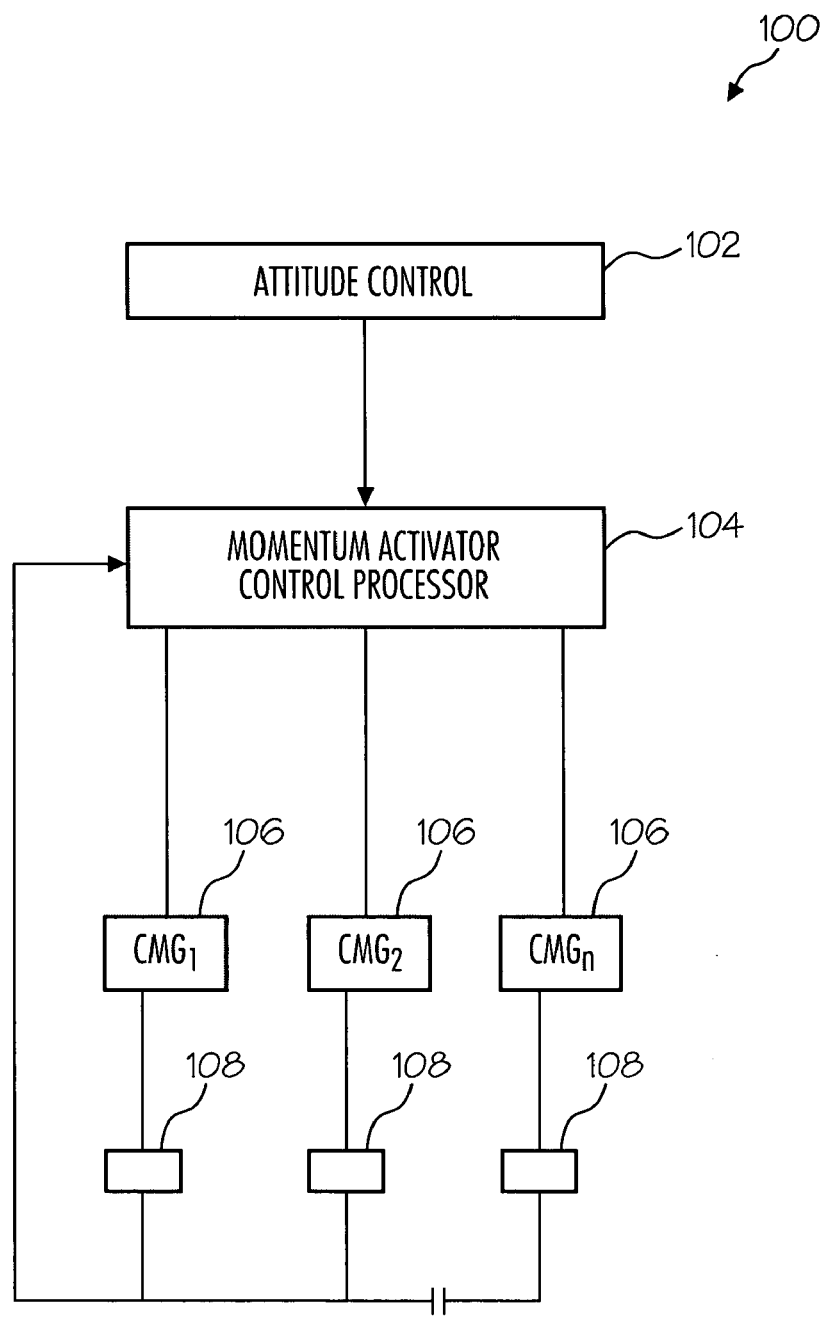
FIG. 1 is a block diagram illustrating an exemplary CMG control system.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The following detailed description describes the use of the present invention in terms of its use in an exemplary CMG array singularity avoidance system. However, applications of the present invention are not limited to any one specific application or embodiment, but are useful in many different areas of endeavor.

The present invention takes advantage of null-space steering to prevent the occurrence of singularities when moving the CMGs in a CMG array to provide torque. Furthermore, the present invention does so in a way that optimally conditions the CMG array at all times, keeping the CMG array as far as possible from any singularity. As discussed previously, a minimum of three CMGs are required to provide the three degrees of freedom needed to orient a spacecraft. However, in many cases more than three CMGs are implemented. The extra CMGs are typically provided for mechanical redundancy purposes but are occasionally used in the implementation of sophisticated steering laws like the present invention. Each extra CMG provides an extra mathematical degree of freedom. As discussed previously, in a three-dimensional vector space, the CMGs' gimbal rates can be mapped into a three-dimensional torque array by use of the Jacobian A:

$$A\omega = \tau \quad (1)$$

where, in this three-CMG example, A is a 3×3 matrix, $\omega$ is a 3×1 matrix, and $\tau$ is a 3×1 matrix. If extra CMGs are provided and n is the number of CMGs in the CMG array, then A will be a 3×n matrix, $\omega$ an n×1 matrix and $\tau$ a 3×1 matrix. For a CMG array comprising n CMGs, with n>3, the subspace of the n-dimensional vector space associated with the nonzero singular values of A is known as the range space. When rank(A)=3, the range space of A is the three-dimensional physical space, which is inhabited by the three-dimensional, physical torque.

The rest of the n-dimensional vector space is known as the null space. The null space is outside and perpendicular to the range space. Together, both the range space and the null space completely span the n-dimensional vector space. Values of $\omega$ that lie entirely within the null space of A produce no physical torque. A 3×n matrix A provides for a three-dimensional range space and a null space of dimension at least n−3.

When changing the attitude of a spacecraft, only the movement of CMGs in the range space affects the attitude of the spacecraft. Conversely, motions of the CMG gimbals in the null space produce no physical torque and, thus, no error in the torque provided by the CMGs. A matrix B can be defined as spanning the null space of matrix A. One way to compute B is:

$$B = I - A^T(AA^T)^{-1}A \quad (2)$$

where I is the identity matrix.

While movement of the CMGs in the null space does not affect the torque provided by the CMG array, the movement of the CMGs in the null space can affect how each CMG gimbal angle contributes to the total gimbal rate, $\omega$, an n×1 array, required to produce the torque:

$$\omega = \omega_r + \omega_n \quad (3)$$

where $\omega_r$ is the portion of the total gimbal-rate vector that lies within the range space, and $\omega_n$ is the portion within the null space.

An exemplary control system 100 for implementing the present invention is illustrated in FIG. 1. The components of the control system 100 are known in the art and can be assembled in different ways using different processors, software, controllers, sensors and the like. The control system 100 includes an attitude control system 102 coupled to a momentum actuator control processor 104. CMGs 106 are coupled the momentum actuator control processor 104. Associated with each CMG 106 are one or more CMG sensors 108 for providing information concerning the state of the CMG 106 to the control system. Control system 100, in one embodiment, is mounted on a spacecraft such as an orbiting satellite.

Attitude control system 102 controls the positioning of a spacecraft. The attitude control system 102 receives data concerning a desired spacecraft maneuver and determines an appropriate torque command to complete the desired maneuver. The torque commands are presented to the momentum actuator control processor 104. The momentum actuator control processor 104, in response to the torque commands, calculates the gimbal rates necessary to produce the commanded torque. Additionally, the momentum actuator control processor 104 calculates CMG movement in both the range space and the null space to prevent singular conditions.

The momentum actuator control system processor 104, based on the above identified calculations, provides the necessary commands to the CMGs 106 such that the CMG movement produces the commanded torque and, in accordance with the teachings of the present invention, provides the torque while preventing conditions that lead to a singularity. In one embodiment, there are at least four CMGs: three mathematical degrees of freedom to provide motion in the range space (the desired torque) and at least one additional degree of freedom to allow null-space motion to steer away from singularities. Individual CMGs are not necessarily devoted exclusively to range-space or null-space motion; rather, all of the CMGs, working in concert, produce both range-space and null-space effects.

Since movement of the CMGs in the null space can change how the output torque is achieved, movement in the null space can be used to avoid singularities. For example, in one embodiment of the present invention, the movement of the CMGs in the null space can be coordinated such that the determinant of $(AA^T)$ is always far from zero. As discussed previously, when $\det(AA^T) = 0$, a singularity will occur. In this embodiment, while the range-space gimbal rates are determined as before, the gimbal rates in the null space are determined such that $\det(AA^T)$ is maximized.

Figure 2:
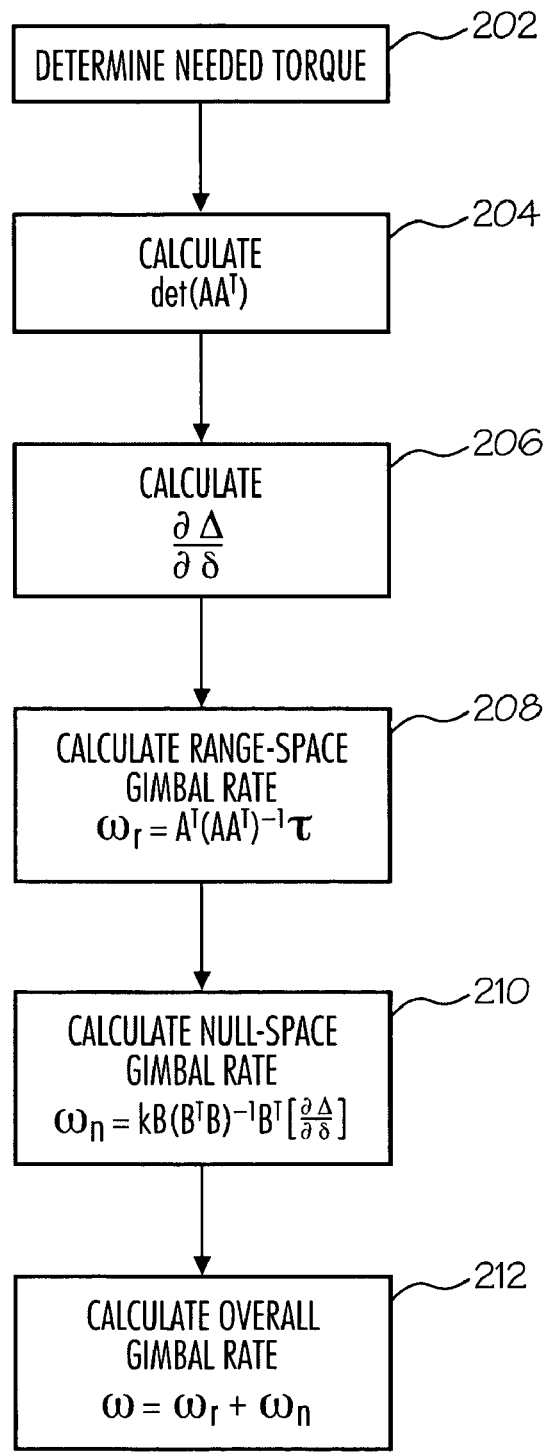
FIG. 2 is a flowchart illustrating a determinant-maximizing CMG steering law.

FIG. 2 is a flowchart illustrating a method for maximizing the determinant of $(AA^T)$ using null-space steering. In a first step, step 202, the torque required to move the spacecraft is determined, in one embodiment by the attitude control system 102. Next, in step 204, the elements of the $AA^T$ matrix are calculated to determine the determinant. The result is an entirely analytical gradient-steering method, whose explicit solution for the gimbal motion eliminates the need for numerical search algorithms. For example, given (for a n-CMG system) a Jacobian A whose columns are represented by:

$$A = [v_1 v_2 \ldots v_n] \quad (4)$$

the determinant of the symmetric matrix $AA^T$ depends on the six terms found in:

$$AA^T = \begin{bmatrix} \sum_{i=1}^{n} v_{ix}^2 & \sum_{i=1}^{n} v_{ix}v_{iy} & \sum_{i=1}^{n} v_{ix}v_{iz} \\ & \sum_{i=1}^{n} v_{iy}^2 & \sum_{i=1}^{n} v_{iy}v_{iz} \\ (sym) & & \sum_{i=1}^{n} v_{iz}^2 \end{bmatrix} \quad (5)$$

These six values can be computed from the known elements of A using:

$$S_{jk} = \sum_{i=1}^{n} v_{ij}v_{ik} \quad (6)$$

In terms of these precomputed values, the determinant of $(AA^T)$ can be expressed as:

$$\det(AA^T) = \Delta = S_{xx}S_{yy}S_{zz} + 2S_{xy}S_{xz}S_{yz} - S_{xx}S_{yz}^2 - S_{yy}S_{xz}^2 - S_{zz}S_{xy}^2 \quad (7)$$

In a next step, step 206, the change in the determinant, $\Delta$, with respect to the change in output torque direction, $\delta$, can be calculated:

$$\frac{\partial \Delta}{\partial \delta} = \begin{bmatrix} \frac{\partial \Delta}{\partial \delta_1} & \frac{\partial \Delta}{\partial \delta_2} & \cdots & \frac{\partial \Delta}{\partial \delta_n} \end{bmatrix} \quad (8)$$

To calculate $\partial \Delta/\partial \delta$, the chain rule can be used. From the chain rule:

$$\frac{\partial \Delta}{\partial \delta_i} = \frac{\partial \Delta}{\partial v_i} \frac{\partial v_i}{\partial \delta_i}. \quad (9)$$

Given that the elements of the Jacobian A can be expressed as:

$$v_i = g_i^x \hbar_i = g_i^x e^{(\delta_i g_i^x)} \hbar_{0,i} \quad (10)$$

where $g_i$ is the $i^{th}$ CMG's gimbal axis rate and $h_i$ is the $i^{th}$ CMG's angular momentum. The derivative of $v_i$ with respect to the $i^{th}$ gimbal angle can thus be calculated:

$$\frac{\partial v_i}{\partial \delta_i} = g_i^x g_i^x e^{(\delta_i g_i^x)} \hbar_{0,i} \quad (11)$$

The matrix exponential $e^{\delta_i g_i^x}$ is used as a convenience in the derivation. In practice, this direction-cosine matrix is a simple function of the gimbal axis and sines and cosines of the gimbal angle. The matrix exponential $e^{\delta_i g_i^x}$ represents a rotation of an angle $\delta$ about an axis $g_i$.

The derivative of the determinant with respect to $v_i$ can be found in its x, y and z components as:

$$\frac{\partial \Delta}{\partial v_{i,x}} = 2v_{i,x}S_{yy}S_{zz} + S_{yz}(v_{i,y}S_{xz} + v_{i,x}S_{xy}) - 2v_{i,x}S_{yz}^2 - 2v_{i,z}S_{yy}S_{xz} - 2v_{i,y}S_{zz}S_{xy}$$

$$\frac{\partial \Delta}{\partial v_{i,y}} = 2v_{i,y}S_{xx}S_{zz} + 2S_{xz}(v_{i,z}S_{xy} + v_{i,y}S_{yz}) - 2v_{i,z}S_{xx} - 2v_{i,y}S_{xz}^2 - 2v_{i,x}S_{zz}S_{xy} \quad (12)$$

$$\frac{\partial \Delta}{\partial v_{i,z}} = 2v_{i,y}S_{xx}S_{yy} + 2S_{xy}(v_{i,x}S_{xz} + v_{i,y}S_{yz}) - 2v_{i,y}S_{xx}S_{yz} - 2v_{i,x}S_{xz}S_{yy} - 2v_{i,z}S_{zz}^2$$

Eqn. 12 can be precomputed using Eqn. 6. Then, the change in determinant with respect to the output torque direction, $\partial \Delta/\partial \delta$, can be determined from Eqns. 11 and 12 using the chain rule as shown in Eqn. 9 The result is an analytical expression for incremental change in the determinant with respect to incremental change in the output torque direction.

Next, in step 208, the range-space gimbal rate can be calculated using:

$$\omega_r = A^T(AA^T)^{-1}\tau \quad (13)$$

Then, in step 210, the null-space gimbal rate can be calculated from:

$$\omega_n = KB(B^TB)^{-1}B^T\left[\frac{\partial \Delta}{\partial \delta}\right]^T \quad (14)$$

K is a matrix or scalar gain, either constant or otherwise, selected to ensure that the gimbal rate never exceeds a maximum value and so that, for all points in the CMG array's capability, the determinant, $\det(AA^T)$, is driven away from singularities faster than it is drawn to them.

$B(B^TB)^{-1}B^T$ projects the gimbal motion that would follow the gradient of the determinant exactly onto the null space so that it does not influence the output torque. In the present embodiment, since A has a rank of three and because null-space steering ensures the invertibility of $AA^T$, closed-form solutions for the pseudoinverse of A and for the null space of A (i.e. B) are possible:

$$B = I - A^T(AA^T)^{-1}A \quad (15)$$

where I is a 3×3 identity matrix.

$\partial \Delta/\partial \delta$ by is the partial derivative of the determinant with respect to the output torque direction. The components of this vector were previously calculated in step 206. The expression $$\left[\frac{\partial \Delta}{\partial \delta}\right]^T$$

is used as the pseudoinverse of $\partial \Delta/\partial \delta$. The traditional pseudoinverse includes a factor of one over the square of the magnitude. Since, in this case, the magnitude can never go to zero in the gimbal angle set, this term can be excluded. The result is a bell-behaved, stable, null-space command.

Next, in step 212, the total n×1 gimbal rate command, $\omega$, can be determined as the sum of the range-space gimbal rate and the null-space gimbal rate:

$$\omega = \omega_r + \omega_n \quad (16)$$

This is the commanded gimbal rate for each CMG in the CMG array.

In a second embodiment, the null-space steering maximizes a weighted sum of the eigenvalues of $(AA^T)$. For an n×n matrix, D, a scalar, $\lambda$, is an eigenvalue of D if there is a non-zero vector x such that $Dx = \lambda x$. The eigenvalue can be found by first rewriting $Dx = \lambda x$ as $[D - \lambda_0 I]x = 0$. This equation has a non-trivial solution if and only if $\det(D - \lambda_0 I) = 0$. Also, it is known that the $\det(D) = \det$ $$D = \prod_{i=1}^{n} \lambda_i.$$

That is, the product of the eigenvalues equals the determinant of the matrix. So, indirectly, this embodiment also steers the CMGs in a way that attempts to optimize the determinant. The difference in this embodiment is that each of the eigenvalues can be treated individually, an approach that may offer more versatility in some applications.

Figure 3:
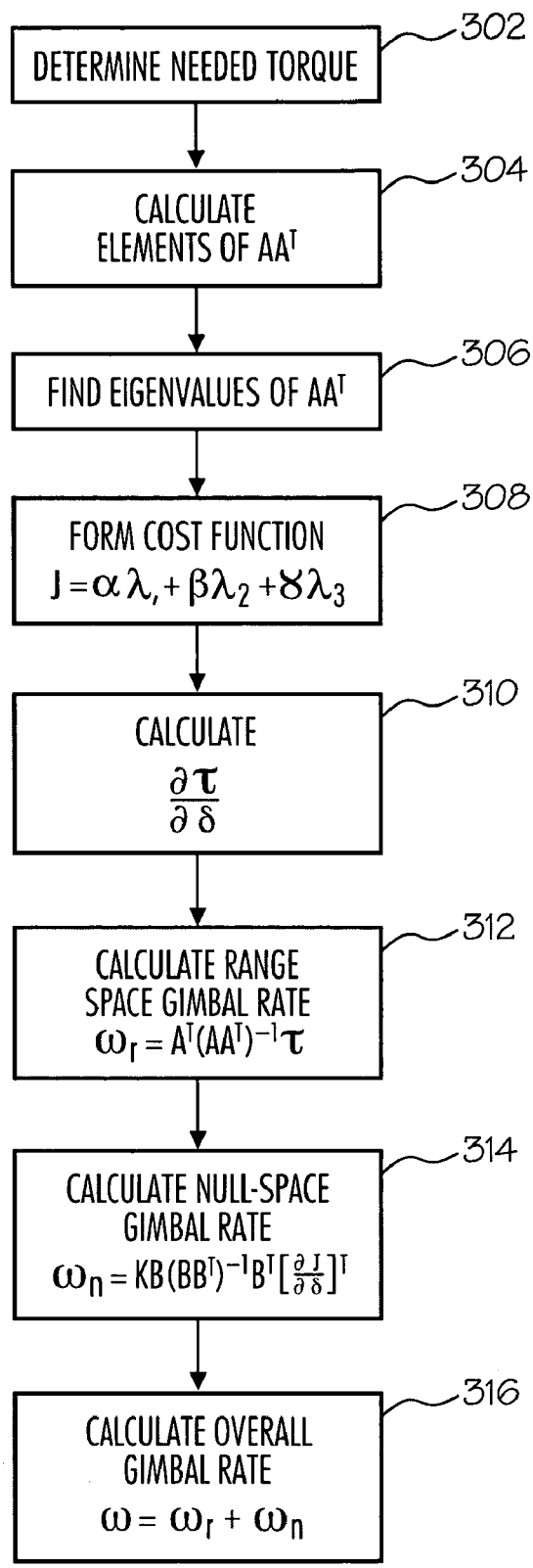
FIG. 3 is a flowchart illustrating an eigenvalue-based steering law.

As discussed previously, when $\det(AA^T)=0$ the CMG array is singular. Since the product of the eigenvalues of a matrix equals the determinant of the matrix, by maximizing the weighted sum of the eigenvalues, singularities can be avoided. FIG. 3 is a flowchart illustrating an embodiment of the present invention that maximizes the eigenvalues of $(AA^T)$ by null-space motion.

In a first step, the required torque is determined (step 302). This torque is the torque requested to change the attitude of the spacecraft. Next, in step 304, the elements of the matrix $AA^T$ are calculated. The elements of matrix $AA^T$ are calculated in the same manner as the first embodiment.

Next, in step 306, the eigenvalues of $AA^T$ are calculated. As discussed previously the eigenvalues of $AA^T$ can be found from solving $\det(AA^T-\lambda I)=0$ for the $\lambda$. Since $AA^T$ has a rank of three, there will be three eigenvalues: $\lambda_1$, $\lambda_2$, and $\lambda_3$, and the solution to $\det(AA^T-\lambda I)=0$ will be a third-degree polynomial, for which a closed-form, analytical solution can be found. Furthermore, these eigenvalues will all be real and nonzero, further simplifying the computation.

In step 308, a weighted sum of the eigenvalues can be formed as a cost function, J, to be maximized:

$$J=\alpha\lambda_1+\beta\lambda_2+\gamma\lambda_3 \quad (17)$$

In Eqn. 17, the coefficients $\alpha$, $\beta$ and $\gamma$ are weighting factors that can be varied to emphasis a particular eigenvalue if desired. Alternatively, the coefficients can be given equal weight.

In step 310, the derivative of the cost function with respect to the gimbal angle can be calculated using the chain rule:

$$\frac{\partial J}{\partial \delta_i} = \frac{\partial J}{\partial v_i} \frac{\partial v}{\partial \delta_i} \quad (18)$$

where, as before, $$\frac{\partial v_i}{\partial \delta_i} = g_i^x g_i^x e^{(\delta_i g_i^x)} \hat{h}_{0,i} \quad (19)$$

Moreover, for this embodiment:

$$\frac{\partial J}{\partial v_i} = \frac{\partial J}{\partial \lambda_i} \frac{\partial \lambda_i}{\partial v_i} \quad (20)$$

Both $\partial v_i / \partial \delta_i$ and $\partial J / \partial v_i$ can be computed analytically from the eigenvalues determined previously. After $\partial J / \partial \delta_i$ is calculated, in step 312, the range-space gimbal rate can be calculated as before:

$$\omega_r = A^T(AA^T)^{-1}\tau \quad (21)$$

Then, in step 314, the null-space gimbal rate can be calculated:

$$\omega_n = KB(B^TB)^{-1}B^T\left[\frac{\partial J}{\partial \delta}\right]^T \quad (22)$$

where K is the gain as discussed previously, $B(B^TB)^{-1}B^T$ projects the gradient of the cost function on to the null space and $\partial J / \partial \delta$ is the partial derivative of the cost function with respect to gimbal angle. In step 316, the total gimbal rate is calculated as the sum of the range-space gimbal rate, $\omega_r$, and the null-space gimbal rate, $\omega_n$:

$$\omega=\omega_r+\omega_n \quad (23)$$

This sum gives the gimbal rate that both produces the desired torque without an error and ensures that the torque is produced without encountering a singularity of a CMG.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for avoiding singularities in the movement of CMGs in an array of CMGs in a spacecraft comprising:
   receiving a torque command representing a desired torque to produce an attitude adjustment for the spacecraft;
   computing a range-space gimbal rate to produce the desired torque based on the received torque command;
   computing a null-space gimbal rate that assists in the avoidance of singularities;
   computing a total gimbal rate command by summing the range-space gimbal rate and the null-space gimbal rate; and
   supplying the total gimbal rate command to the CMGs to produce a total gimbal rate.

2. The method of claim 1 wherein the step of computing a null-space gimbal rate further comprises computing a null-space gimbal rate based on a null-space projection of a performance gradient.

3. The method of claim 2 wherein the step of computing a null-space gimbal rate based on the null-space projection of a performance gradient further comprises computing a null-space gimbal rate based on the projection of a determinant of a product of a Jacobian matrix and the transpose of the Jacobian matrix.

4. The method of claim 2 wherein the step of computing a null-space gimbal rate based on the null-space projection of a performance gradient further comprises computing a null-space gimbal rate based on a projection of eigenvalues of a product of a Jacobian matrix and the transpose of the Jacobian matrix.

* * * * *